United States Patent [19]

Sasaki et al.

[11] 4,224,073
[45] Sep. 23, 1980

[54] ACTIVE SILICON CARBIDE POWDER CONTAINING A BORON COMPONENT AND PROCESS FOR PRODUCING THE SAME

[75] Inventors: Tadao Sasaki, Takarazuka; Takasi Natori, Higashiosaka; Isamu Komaru, Ashiya, all of Japan

[73] Assignee: Nippon Crucible Co., Ltd., Tokyo, Japan

[21] Appl. No.: 931,065

[22] Filed: Aug. 4, 1978

[30] Foreign Application Priority Data

Aug. 4, 1977 [JP] Japan ................................ 52-93613

[51] Int. Cl.³ .............................................. C04B 35/56
[52] U.S. Cl. .................................................... 106/44
[58] Field of Search ........................... 106/44; 423/345

[56] References Cited

U.S. PATENT DOCUMENTS

| 3,853,566 | 12/1974 | Prochazka | 106/44 |
| 3,954,483 | 5/1976 | Prochazka | 106/44 |
| 3,968,194 | 7/1976 | Prochazka | 106/44 |
| 4,080,415 | 3/1978 | Coopola et al. | 106/44 |
| 4,117,096 | 9/1978 | Hosaka et al. | 106/44 |
| 4,133,689 | 1/1979 | Stroke | 106/44 |

Primary Examiner—O. R. Vertiz
Assistant Examiner—Mark Bell
Attorney, Agent, or Firm—Sughrue, Rothwell, Mion, Zinn and Macpeak

[57] ABSTRACT

An active silicon carbide powder containing a boron component, which contains the boron component as boron carbide or as a solid solution thereof in a uniformly dispersed state in an amount of about 0.2 to 10 wt %, calculated as boron carbide and a process for producing the same.

3 Claims, 1 Drawing Figure

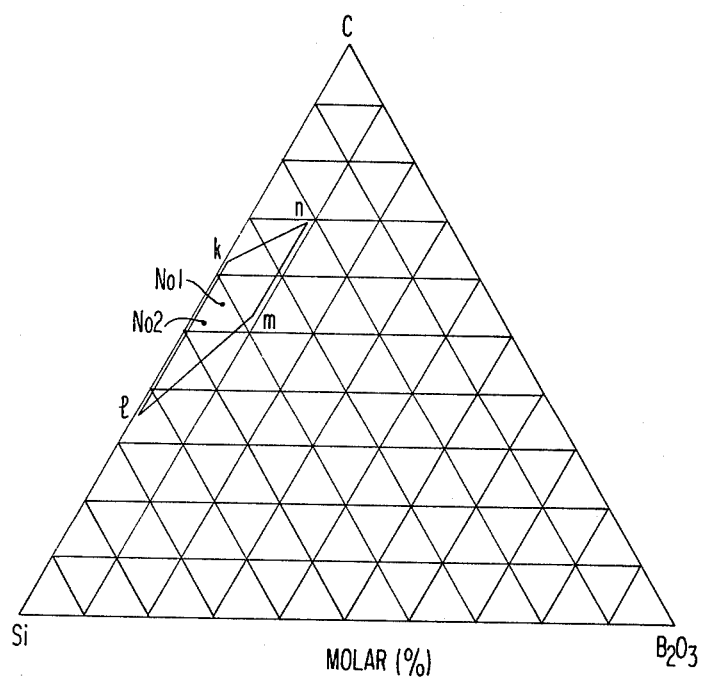

ACTIVE SILICON CARBIDE POWDER CONTAINING A BORON COMPONENT AND PROCESS FOR PRODUCING THE SAME

BACKGROUND OF THE INVENTION

1. Field of the Invention

This invention relates to an active silicon carbide powder containing a boron component and to a process for producing the same. More particularly, it relates to an active silicon carbide powder containing a boron component as boron carbide or as a solid solution or the like, and to a process for producing the same.

2. Description of the Prior Art

Silicon carbide is used for various applications in addition to heat-resistant industrial materials due to its high hardness, excellent oxidation resistance, excellent corrosion resistance, excellent spalling resistance and excellent strength at high temperatures. Of those applications, wrapping materials, pigments or materials for forming the matrix of, for example, a refractory require the silicon carbide to have not only a fine particle size but also an increased activity. Therefore, a process of pulverizing silicon carbide as finely as possible and, in addition, adding boron or a compound thereof, in particular boron carbide, in an appropriate amount depending on the end-use have so far been used. Recently, a process for producing an active β-type silicon carbide powder with a submicron particle size, which comprises uniformly incorporating a boron component, although in a slight amount, has been disclosed [e.g., as disclosed in Japanese Patent Application (OPI) No. 160,200/75 (The term "OPI" as used herein refers to a "published unexamined Japanese patent application."), corresponding to U.S. patent application Ser. No. 471,303, filed May 20, 1974]. However, difficulty arises in using the former process due to the lack of availability economically of a boron or boron carbide powder having the desired particle size and purity and due to mixing techniques or the like available. Further, difficulty in obtaining a starting material of fine silicon carbide itself which is preferred prevents the process from being put into practical use. On the other hand, applications of the latter process are limited since the content of the boron component, calculated as boron carbide, is as low as 1.3% by weight or less and, in addition, restrictions on production techniques, e.g., the preparation of the starting material is complicated and a special reactor is needed for synthesis, naturally limit the industrial utilization of the latter process.

SUMMARY OF THE INVENTION

Accordingly, the present invention provides an active silicon carbide powder containing about 0.2 to about 10 wt %, calculated as boron carbide, of a boron component as boron carbide or as a solid solution or the like in a uniformly dispersed state, and a process for producing the same.

BRIEF DESCRIPTION OF THE DRAWING:

The FIGURE is a triangular diagram showing the preferred composition range (molar %) of starting material mixtures in the ternary system of carbon (C), silicon (Si) and boron oxide ($B_2O_3$) for providing the active silicon carbide powder of the present invention containing a boron component.

DETAILED DESCRIPTION OF THE INVENTION

This invention provides an active silicon carbide powder containing a boron component as boron carbide or as a solid solution or the like, and a process for producing the same. The process of this invention comprises using carbon powder of a particle size of about 20 μm or less, metallic silicon powder and a powder of a boron oxide such as boric acid as starting materials, mixing these materials so that the molar % of each component in the ternary system of carbon (C), silicon (Si) and boron oxide ($B_2O_3$) falls inside the area in the FIGURE defined by k(C=62.4, Si=37.4, $B_2O_3$=0.2), l (C=34.9, Si=64.9, $B_2O_3$=0.2), m (C=52, Si=39, $B_2O_3$=9), and n (C=69, Si=22, $B_2O_3$=9), placing the resulting mixture in a refractory vessel and heating the mixture in an oxidizing atmosphere containing about 0.3 to about 35 volume % of oxygen to cause a spontaneous reaction at a temperature of about 800° to about 1,450° C., the reaction being instantaneously completed.

An aspect of the present invention resides in heating a mixture of a carbon powder, a silicon powder and a boron oxide powder in an oxidizing atmosphere.

Although the details of the reaction mechanism are not at present clear, oxygen probably reacts with a certain component in the mixture, when the mixture of carbon powder, silicon powder and boron oxide powder is heated in an oxidizing atmosphere, to form an intermediate product, and this product in turn functions as a catalyst to partly initiate the reaction between carbon and silicon, which reaction triggers the overall reaction at a surprisingly low temperature range with the reaction between the three component being instantly (actually in about 1 to about 2 minutes) completed. (The reaction which is induced in this low temperature range and rapidly proceeds to completion in a short period of time is herein referred to as a "spontaneous continuous reaction.")

Since the starting materials and the reaction products are not exposed to high temperatures for a long time in this spontaneous continuous reaction, deterioration of the products can substantially be avoided even though an oxidizing atmosphere is employed.

The reaction of producing boron carbide from boron oxide and carbon is an endothermic reaction as illustrated below.

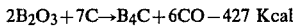

$$2B_2O_3 + 7C \rightarrow B_4C + 6CO - 427 \text{ Kcal}$$

Therefore, this reaction requires a considerable amount of heat energy to accomplish. However, the above-described spontaneous continuous reaction enables boron carbide to be formed in a considerable proportion.

Thus, an active silicon carbide powder containing this boron component as boron carbide or as a solid solution or the like in a uniformly dispersed state can be obtained in a much larger amount than with conventional processes.

In the process of this invention, the particle size of the carbon powder must be about 20 μm or less. If the particle size is greater than about 20 μm, the spontaneous continuous reaction is not induced and most of the starting material or part of the carbon powders would remain unreacted. In practicing the process, the particle size of the carbon material may be appropriately selected within the above range depending on the end-use of the product. In order to obtain, for example, a fine product with a high activity, carbon materials with a particle size which is as fine as possible should be selected.

When the spontaneous continuous reaction starts, the temperature of the mixture rapidly increases due to the heat of reaction generated, and not only part of the silicon but most of the boron oxide which has a lower melting point than the melting point of other materials, such as silicon or carbon, are melted or vaporized to respectively participate in the complicated reaction with the carbon.

Therefore, the particle size of the silicon and the boron oxide may be coarser than that of the carbon material. Silicon particles having a maximum particle size of up to about 200 $\mu$m and boron oxide particles having a maximum particle size of up to about 500 $\mu$m may be used.

Those starting materials which satisfy the abovedescribed particle size requirements can be used as carbon materials in this invention. Readily available carbon materials such as natural graphite, artificial graphite, coke, raw coke, carbon black, pitch from coal or petroleum, etc. are generally used. A wide range of silicon materials ranging from those silicon materials suitable for semiconductors to those silicon materials suitable for general industrial use, e.g., of a purity of 90 wt % or more, can be employed. Suitable and representative examples of boron oxides are boric acid of a reagent grade or for general industrial use. Boron oxide ($B_2O_3$) also is suitable.

The purity of each starting material used in this invention does not greatly influence the reaction for forming the end product (the spontaneous continuous reaction), but the purity of the starting materials to some extent influences the purity and particle size of the product obtained. Therefore, the purities of the starting materials are appropriately selected depending on the end-use of the product.

The molar ratio of carbon, silicon and boron oxide which are mixed is described below. In the spontaneous continuous reaction which is an important aspect of the present invention, the molar ratio of the starting materials depends upon various factors such as the particle sizes of the starting materials, the degree of mixing, the size of the batch mixed, the heating rate and temperature, the oxygen concentration in the atmosphere, etc. In addition, not only silicon and boron oxide, but a part of the carbon as well, might dissipate as a gaseous product such as CO, $SiO_2$, $B_2O_3$, etc., independently or through mutual reaction. Therefore, it is difficult in the present invention to stoichiometrically calculate the molar ratio of the starting materials which should be used, and hence the appopriate molar ratio is determined experimentally. The starting materials are preferably mixed so that the molar ratio of carbon, silicon and boron oxide is in the area bounded by k, l, m and n shown in the FIGURE.

The FIGURE is a triangular diagram showing a ternary system composition, wherein each point k, l, m and n represents the following composition (in mol %):

k: C=62.4, Si=37.4 $B_2O_3$=0.2;
l: C=34.9, Si=64.9, $B_2O_3$=0.2;
m: C=52, Si=39, $B_2O_3$=9;
n: C=69, Si=22, $B_2O_3$=9.

Compositions within the area defined by these points in the FIGURE, but not at these points or on lines connecting these points, thus can be used in this invention.

In the upper region toward line k–n (inclusive), a large amount of unreacted carbon mainly remains, whereas in the lower region toward the line l–m (inclusive) metallic silicon alone first is mainly sintered and as a result the spontaneous continuous reaction (the intended reaction) is not induced or, if the spontaneous continuous reaction takes place, a large amount of metallic silicon sintered product remains, which prevents pulverization of the reaction product.

In the region on the right hand side toward the line m–n (inclusive), an endothermic reaction between boron oxide and carbon becomes so predominant that the spontaneous continuous reaction is difficult to achieve.

In the region on the left hand side toward the line k–l (inclusive), the amount of the boron component is so small that an actually effective activity cannot be imparted to the product.

Thus, starting material compositions inside the region k, l, m and n cause the spontaneous continuous reaction to occur which is instantaneously completed to provide the active silicon carbide powder intended. As the amount of the boron oxide is increased within this range, the amount of the boron component in the resulting silicon carbide powder is increased and as a result the particle size becomes finer and more activity is obtained. Thus, in practicing the process, the ratio of the starting materials should be appropriately selected within this range depending on the end-use of the silicon carbide powder keeping the points described above in mind.

The starting materials are mixed well using conventional techniques, and charged in a suitable refractory vessel, followed by heating in an oxidizing atmosphere. The spontaneous continuous reaction is induced regardless of the bulk density of the material mixture charged. However, as the bulk density increases, the particle size of the resulting silicon carbide powder becomes coarser. Thus, the bulk density is appropriately selected in practice depending on the end-use.

If the oxygen concentration in the atmosphere used on heating is lower than about 0.3 volume %, the spontaneous continuous reaction is not induced, whereas if the oxygen concentration is higher than about 35 volume %, increased problems due to excessive oxidation occur, and such concentrations are not advantageous. As long as the oxygen concentration is about 0.3 to about 35 volume %, the atmosphere may be air, an atmosphere also containing a reducing gas or an inert gas such as CO, $CO_2$ or Ar, or an atmosphere at a reduced pressure of, for example, up to about 11 mmHg. An ordinary open electric furnace, a gas furnace, a general industrial kiln, etc. can be used in the heating.

In the process of the present invention, heating must be conducted until the starting material mixture reaches a sufficiently high temperature that the spontaneous continuous reaction is induced. The heating temperature will vary depending upon the particle size of each of the starting materials, the mixing ratio, the condition of mixing, the size of the batch, the size of the refractory vessel, the oxygen concentration in the atmosphere, heating rate, etc., but a suitable temperature generally ranges from about 800° C. to about 1,450° C.

The temperature at which the spontaneous continuous reaction is induced can easily be determined through routine preliminary experiments. The temperature is preferably set at a slightly higher temperature than the thus determined temperature. The heating time is usually within 10 hours including the time required to raise the temperature to the level used. The lower the oxygen concentration in the atmosphere, the longer the heating time is.

The silicon carbide product obtained by inducing the spontaneous continuous reaction of the present invention is easily pulverized without any particular mechanical pulverization technique being used, and is obtained as a powder wherein most particles have a particle size of about 500 μm or less. The silicon carbide product can be finely pulverized with ease by pulverizing using an ordinary ball mill, a vibratory mill, or a like grinder. The finer the starting carbon particles and the higher the amount of boron oxide present, the more finely the product can be pulverized.

A powder of a maximum particle size of about 60 μm and in a submicron mean particle size can be obtained extremely easily.

The product obtained by inducing the spontaneous continuous reaction of this invention comprises silicon carbide and a boron-containing component mainly as β-crystals of silicon carbide. This has been confirmed by X-ray analysis, and chemical analysis has revealed that the amount of the boron-containing component, calculated as boron carbide, is within the range of from about 0.2 to 10 wt %, and that the purity of the sum of the silicon carbide component and the boron-containing component of as high as 95 wt % or more can easily be obtained. The boron-containing component appears, based on X-ray analysis and chemical analysis, to be uniformly distributed throughout the silicon carbide product powder as boron carbide or as a solid solution with silicon carbide. However, some unidentified components are also observed, but the details thereof are not at present clear.

EXAMPLE 1

2.92 Kg of commercially available carbon black (purity: 98.4 wt %) of a mean particle size of 0.05 μm, 5.36 kg of commercially available metallic silicon powder (purity: 94.6 wt %) of a mean particle size of 77 μm, and 2.06 kg of commercially available boric acid powder (purity: 99.8 wt %) of a mean particle size of 200 μm were mixed with each other. The molar % of the components of this mixture corresponded to point No. 1 shown in the FIGURE, that is, C=55, Si=41, and $B_2O_3$=4 (molar %).

Water was added to this mixture in an amount of 35 wt parts per 100 parts by weight of the mixture, and kneaded. Then, the thus kneaded mixture was charged in a cylindrical refractory vessel of an inside diameter of 260 mm and a height of 300 mm and, after lightly covering the vessel, this cylindrical refractory vessel was heated in a siliconit box-type electric furnace in the air ($O_2$=20 volume %; $N_2$=80 volume %) with a heating rate of about 300° C./hr. When the temperature reached about 1,080° C., a marked degree of fuming was observed, which showed spontaneous reaction initiation. This phenomenon continued for about 1 to about 2 minutes. Heating was continued and, when the temperature reached 1,120° C., the electric power was turned off, and the vessel was allowed to cool. After 20 hours, the heated product was removed. The heated product appeared somewhat white and had an oxidized surface layer of a thickness of about 5–10 mm, but the interior of the product appeared yellowish gray, which clearly showed the formation of a uniform reaction product. No sintering of this reaction product apparently occurred and the reaction product could easily be pulverized to a powder of an apparent particle size of about 200 μm or less. Further, a fine powder of a mean particle size of 0.6 μm was obtained by merely grinding the product in a dry manner for 15 minutes using an automatic mortar and pestle (a laboratory grinder, manufactured by Yamato Kagaku K.K.). The properties of the thus obtained powder based on X-ray analysis were such that most of the powder was silicon carbide except a slight amount of boron carbide and some unknown materials, and the silicon carbide was identified as β-crystals of silicon carbide. The lattice constant of a boron component-free, β-type silicon carbide powder with a high purity was 4.3633 Å, whereas that of the product of the present invention was determined to be 4.3589 Å, smaller than that of the former. Thus, it is believed a part of the boron component was present as a solid solution. Wet chemical analysis of the product excluding the surface layer revealed that the content of the boron-containing component, calculated as boron carbide, was 6.1 wt %, and the purity of the sum of the boron-containing component and the silicon carbide component was 95.6%. 20 g of the fine powder produced as described above with a mean particle size of 0.6 μm was charged in a mold made of artificial graphite, and the temperature was increased from room temperature to 2,000° C. in about 30 minutes while applying thereto a pressure of about 200 kg/cm² using a high frequency induction heated hot-press apparatus. This temperature was maintained for 30 minutes, then, the pressure was removed and electric power was turned off, and the apparatus was allowed to cool. For comparison, a boron component-free, β-type silicon carbide powder of a mean particle size of 2.5 μm and a purity of 97.5% was heat-treated in the same manner under the same conditions. The comparative product had an apparent porosity of as high as 15.0%, whereas the product of the present invention was a tightly sintered product having a dense structure of an apparent porosity of 0.04 vol %. Thus, this demonstrated the excellent activity of the silicon carbide powder of the present invention.

EXAMPLE 2

The same starting material mixture as described in Example 1 was charged in a refractory vessel in the same manner as described in Example 1 and, after lightly covering the vessel, the vessel was buried in cokebreeze, and baking was conducted for about 40 hours using a tunnel kiln for baking refractories, with a heating zone temperature of about 1,230° C. The composition of the atmosphere in the heating zone within the kiln was as follows: $O_2$=3.2; CO=0; $CO_2$=10.8; $H_2O$=13.9; $N_2$=77.0 (volume %). The thus obtained heat-treated product had an even thinner surface layer than that of Example 1. The properties of this product were exactly the same as those in Example 1, with the purity of the sum of the boron component and the silicon carbide component being improved to 96.8%.

EXAMPLE 3

The same starting material mixture as described in Example 1 was charged in a refractory vessel in the same manner as described in Example 1. After lightly covering the vessel, this refractory vessel was quickly placed in an electric furnace previously preheated to an inside-furnace temperature of 1,350° C. and rapidly heated. After 1 hour, marked fuming was observed, immediately after which the vessel was removed from the furnace and buried in a preliminarily prepared coke-breeze to forcibly cool. The thus-obtained heat-treated product scarcely had any oxidized surface layer, and appeared uniformly yellowish gray all over. The properties of the product were exactly the same as in Examples 1 and 2 above, with the purity of the sum of the boron component and the silicon carbide component being improved further to 99.0%.

EXAMPLE 4

When the molar % of the starting materials in Example 1 was changed to point No. 2 shown in the FIGURE [i.e., C=52, Si=46, $B_2O_3$=2 (molar %)], fuming took place at about 1,060° C. The electric power was turned off when the temperature reached about 1,100° C., and the system was allowed to cool. The appearance of the heated product was the same as in Examples 1, 2 and 3. When the product was pulverized under the same conditions using a grinder, a fine powder of a mean particle size of 1.5 μm was obtained. Wet pulverization of the powder for about 30 minutes using a laboratory scale vibratory mill yielded a fine powder of a mean particle size of 0.8 μm. In X-ray analysis, no boron carbide peak was observed any more, and only β-type silicon carbide was shown to be present except for peaks of some unknown materials. The lattice constant of the product was 4.3615 Å, which was smaller than that of the β-SiC comparative product with high purity. Thus, it is believed a solid solution of the boron component was formed.

Chemical analysis revealed that the amount of the boron component calculated as boron carbide, was 2.8 wt %, about half of that in the preceding Examples. However, the purity of the sum of the boron component and the silicon carbide component was 95.8% which was not very different from that in the foregoing Examples. When the pulverized powder described above (mean particle size: 1.5 μm) was subjected to the same pressing and heating treatments as described in Example 1 under the same conditions, a tightly sintered product having a dense structure of an apparent porosity of 0.37 vol % was obtained.

EXAMPLE 5

When the procedures as described in Example 1 were repeated and an artificial graphite powder of a mean particle size of 2 μm was used as the carbon material, fuming took place at about 1,270° C. The electric power was turned off at 1,300° C., then the system was allowed to cool. The appearance and other properties of the heated product were almost the same as in preceding Examples, with the particle size of the crystals becoming slightly coarse. The mean particle size of the powder after wet-pulverizing for 30 minutes using an oscillating mill was 5 μm.

While the invention has been described in detail and with reference to specific embodiments thereof, it will be apparent to one skilled in the art that various changes and modifications can be made therein without departing from the spirit and scope thereof.

What is claimed is:

1. A process for producing an active silicon carbide powder containing a boron component, which comprises mixing carbon powder of a particle size of about 20 μm or less, metallic silicon powder and a boron oxide powder as starting materials, so that the molar % of each component in the ternary system of carbon (C), silicon (Si) and boron oxide ($B_2O_3$) falls within the region defined by the area k, l, m and n in the FIGURE, heating the resulting mixture in an oxidizing atmosphere containing about 0.3 to about 35 volume % of oxygen to induce a spontaneous continuous reaction at a temperature of about 800° to about 1,450° C., said reaction being substantially instantaneously completed.

2. The process of claim 1, wherein the metallic silicon powder has a particle size of about 200 μm and the boron oxide has a particle size of about 500 μm.

3. The process of claim 1, wherein the active silicon carbide consists of said silicon carbide and said boron component.

* * * * *